US011353406B2

(12) United States Patent
Prinz

(10) Patent No.: US 11,353,406 B2
(45) Date of Patent: Jun. 7, 2022

(54) TEST APPARATUS FOR CHECKING CONTAINER PRODUCTS

(71) Applicant: KOCHER-PLASTIK MASCHINENBAU GMBH, Sulzbach-Laufen (DE)

(72) Inventor: Heino Prinz, Schwaebisch Hall (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 800 days.

(21) Appl. No.: 15/125,208

(22) PCT Filed: Apr. 30, 2015

(86) PCT No.: PCT/EP2015/000883
§ 371 (c)(1),
(2) Date: Sep. 12, 2016

(87) PCT Pub. No.: WO2015/172865
PCT Pub. Date: Nov. 19, 2015

(65) Prior Publication Data
US 2017/0097305 A1      Apr. 6, 2017

(30) Foreign Application Priority Data

May 13, 2014    (DE) .................... 10 2014 006 835.8

(51) Int. Cl.
*G01N 21/90*      (2006.01)
*B07C 5/34*       (2006.01)
(Continued)

(52) U.S. Cl.
CPC ....... *G01N 21/9027* (2013.01); *B07C 5/3408* (2013.01); *B65B 3/003* (2013.01);
(Continued)

(58) Field of Classification Search
CPC .......... G01N 21/9027; G01N 15/1456; G01N 21/9081; G01N 2201/12; H04N 5/2256;
(Continued)

(56) References Cited

U.S. PATENT DOCUMENTS 5,523,560 A * 6/1996 Manique ............ G01N 21/9027
                                                      209/526
2001/0033372 A1   10/2001 Dragotta
(Continued)

FOREIGN PATENT DOCUMENTS

DE          103 39 473        3/2005
DE     10 2004 051 961         5/2006
(Continued)

OTHER PUBLICATIONS

English translation of JP 6160305 A.*
(Continued)

*Primary Examiner* — Joseph G Ustaris
*Assistant Examiner* — Jill D Sechser
(74) *Attorney, Agent, or Firm* — Wenderoth, Lind & Ponack, L.L.P.

(57) ABSTRACT

A test apparatus checks containers (13) of plastic and produced using the blow-moulding, filling and sealing methods. The containers are filled with fluid that can contain particulate contamination deposited on the container wall when the container (13) is still and floating freely in the fluid when the container (13) is moving and/or changing position owing to the movement. The contamination can be detected by a sensor (37). By a vibration device (23), the container (13) can be oscillated at a prespecifiable excitation frequency such that the particulate contamination (47) in the fluid can be detected.

20 Claims, 4 Drawing Sheets

(51) Int. Cl.
*B65B 3/00* (2006.01)
*B67C 7/00* (2006.01)
*G01N 15/14* (2006.01)
*G06T 7/00* (2017.01)
*H04N 5/225* (2006.01)

(52) U.S. Cl.
CPC ......... *B67C 7/004* (2013.01); *G01N 15/1456* (2013.01); *G01N 21/9081* (2013.01); *G06T 7/0004* (2013.01); *H04N 5/2256* (2013.01); *G01N 2201/12* (2013.01); *G06T 2207/30164* (2013.01)

(58) Field of Classification Search
CPC ......... G06T 7/0004; G06T 2207/30164; B65B 3/003
See application file for complete search history.

(56) References Cited

U.S. PATENT DOCUMENTS

| | | | | |
|---|---|---|---|---|
| 2002/0171054 | A1* | 11/2002 | Yamazaki | G01N 21/9027 250/559.45 |
| 2005/0117149 | A1* | 6/2005 | Grindinger | B07C 5/3408 356/239.4 |
| 2008/0001104 | A1* | 1/2008 | Voigt | G01N 21/8851 250/559.46 |
| 2008/0230720 | A1* | 9/2008 | Nielsen | G01N 21/9027 250/492.1 |
| 2012/0134230 | A1* | 5/2012 | Engelhardt | G01N 13/00 366/142 |
| 2014/0177932 | A1* | 6/2014 | Milne | G01N 21/9027 382/128 |
| 2014/0294238 | A1* | 10/2014 | Kolb | G01N 21/9027 382/103 |

FOREIGN PATENT DOCUMENTS

| | | |
|---|---|---|
| DE | 10 2009 035 585 | 2/2011 |
| EP | 2 458 367 | 5/2012 |
| JP | 6-160305 | 6/1994 |
| JP | 2001-59822 | 3/2001 |

OTHER PUBLICATIONS

English translation of JP 2001059822 A.*
International Search Report (ISR) dated Aug. 18, 2015 in International (PCT) Application No. PCT/EP2015/000883.

* cited by examiner

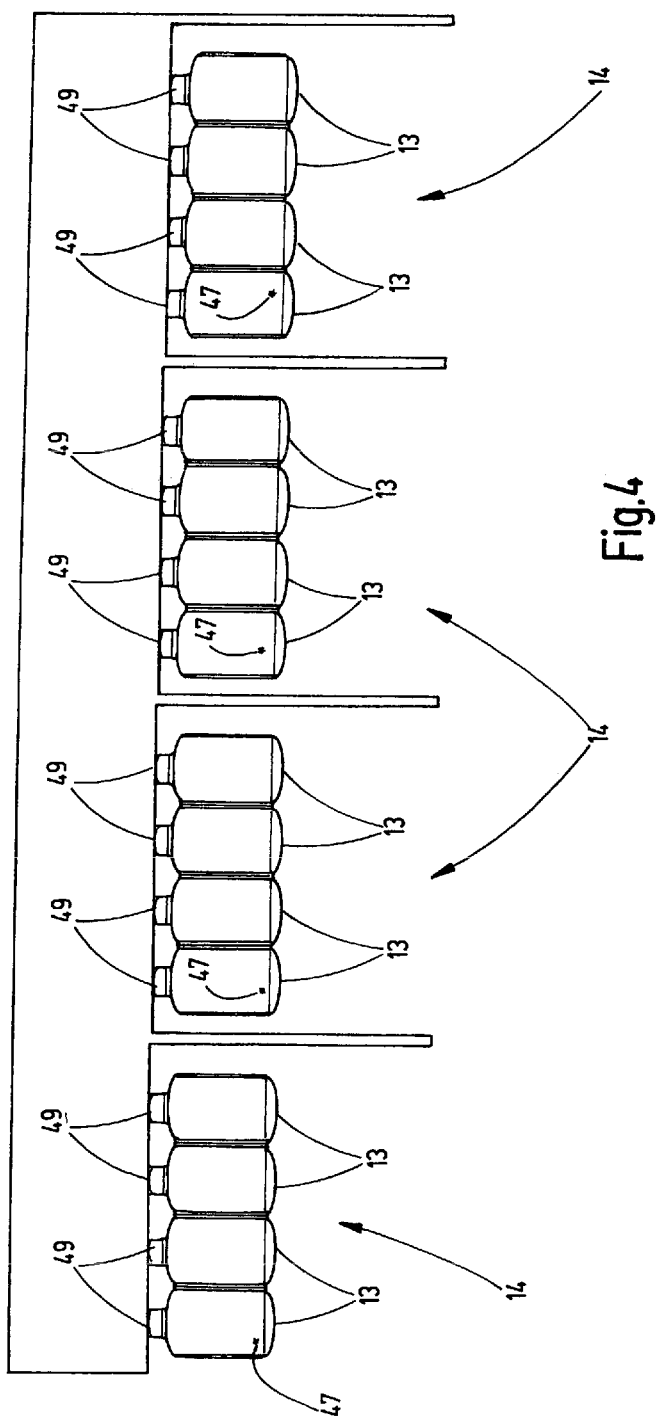

TEST APPARATUS FOR CHECKING CONTAINER PRODUCTS

FIELD OF THE INVENTION

The invention relates to a test apparatus for checking container products that are preferably composed of plastic materials and are produced using the blow-molding, filling and sealing method. The container products are filled with fluid that, for production-related reasons, can contain particulate contamination. The contamination is deposited on the container wall when the container is still and appears floating freely in the fluid when the container is moving and/or at least changes its position. In this way, the contamination can be detected by a sensor.

BACKGROUND OF THE INVENTION

Container products produced according to the blow-molding, filling and sealing method, which is also referred to as BFS method in technical parlance, are produced, particularly in ampoule form, in large quantities, for example using the bottelpack® method known from prior art. Such ampoules are usually used for receiving and dispensing fluids for therapeutic or cosmetic purposes. In particular in the case of ampoules, which are intended for injection purposes, a basic prerequisite for use is, in addition to sterility, the purity of the filling material, i.e., the absence of any dirt particles. With regards to product safety, checking each container product with regard to the integrity of the filling material before distribution is essential. Owing to the large quantities in which ampoule-type or bottle-type container products are produced using the BFS method and the resulting short cycle times in the production process, manual checks of each container are hardly feasible. Automation of the checking process by a test apparatus is unavoidable.

As state of the art in this respect, document DE 103 39 473 A1 discloses an apparatus of the type mentioned at the outset, in which the sensor device has several cameras and a pivot mirror for the detection of particulate contamination. The pivot mirror reflects onto respective cameras light rays produced by lamps when they have passed out of a container. The known apparatus has several disadvantages. To capture each of the containers moved through a test section while standing upright on a circuitous track at high production speeds using a camera, a large number of cameras and a corresponding number of lamps are required. The radiation of the lamps is to be reflected during the circular motion on respective assigned cameras.

In addition to the significant constructional effort, this design requires a corresponding control effort for the pivot motions of the mirror. To permit adequate testing reliability, the mirror pivot motions must be realized in a particularly precisely synchronized manner. In addition, the reliability of the test results is not entirely satisfactory because, during the upright motion of the containers on the circuitous track, significant accumulation of particulate contamination is on the base of the container. To remedy this problem, the known apparatus provides a turntable for each container to be tested. The container is set in rotation about its vertical axis to stir up the fluid. In spite of the significant constructive effort involved, the testing reliability still leaves a lot to be desired. One particular disadvantage is that the known apparatus for testing containers, which are economically produced using the BFS method in the form of container cards based on multiple adjacent and connected containers, cannot be used because a rotation of each container about its vertical axis is not possible.

SUMMARY OF THE INVENTION

The invention addresses the problem of providing a test apparatus that allows economical testing with improved reliability of results.

According to the invention, this object is basically achieved by a test apparatus having, as a significant feature of the invention, a vibration device. The container can be oscillated at a pre-specifiable excitation frequency in such a way that the particulate contamination in the fluid can be detected. As testing has shown, the oscillation motion of the containers leads to free motion of particles with different motion patterns depending on the type of particle. Compared with the known rotational motion of the containers, increased reliability of detection can be achieved, with improved differentiation of the particle types. In particular, high reliability of detection can be achieved when the excitation frequency is appropriately adapted to the fluid properties. The frequency is in the low frequency range of up to 2 kHz for high-viscosity fluids or in the upper range of 2 to 10 kHz for low-viscosity, thin fluids.

Particularly advantageously, the vibration plane of the oscillating motion extends along the longitudinal direction, preferably along the midplane of the container. The container can be a component of a multiple container arrangement connected like cards.

In preferred exemplary embodiments, the excitation frequency is selected such that, depending on the viscosity of the fluid contents of the container, larger air bubbles remain stationary in the fluid. The particulate contamination to be detected moves in the fluid. Erroneous results due to a detection of air bubbles can then be avoided. The excitation frequency can advantageously also be set such that the formation of air bubbles is avoided or minimized.

The sensor device can have at least one emitter, which emits rays such as visible light, infrared light, laser light or X-rays. The rays pass through at least the container wall and the fluid and, after striking a detector disposed on the opposite side, generate a measurement signal that can be evaluated by an evaluation device. The radiation type can be appropriately chosen depending on the transparency or opacity of the container wall. For example, X-rays can be used in the case of an opaque container wall.

In particularly advantageous exemplary embodiments, preferably after the container filled with fluid has been oscillated, a detector formed as a camera/recording device takes several pictures of the particulate contamination moving or being moved in the fluid. The evaluation unit compares image sections captured once without particulate contamination and once with particulate contamination. The comparison of several pictures permits a high level of reliability of the results. The pictures of the picture series can be taken at short time intervals, for example, within one second, i.e., the apparatus according to the invention is suitable for high production speeds.

In particularly advantageous exemplary embodiments, a handling device is provided. The handling device moves the container to be tested to a horizontal position in a station in which the detector is disposed below and the emitter is disposed above the container, and to a second station in which the detector is disposed above and the emitter is disposed below the container. In the first station, the detector, in particular in the form of a camera, can be focused on the lower side wall of the container from below, while in the second station the camera is focused on the fluid surface from above. In this way, air bubbles, which could be wrongly identified as particulate contamination, can be reliably detected because they are situated on the upper side wall in the horizontal position and can be differentiated from other actual dirt particles that are mobile. Also, moved particles and particles, which tend to adhere to side walls, such as plastic particles, can be differentiated from particles that float freely in the fluid.

The detection of dirt particles relies on the identification of free motion of particulate materials in the container, which motion is at a standstill following the oscillating motion. Immediately after the oscillation stops, the fluid is, however, still in motion and produces mobile shadows in pictures, which can lead to an incorrect test result. In view of this problem, in advantageous exemplary embodiments of the invention, the handling device hold the container for a pre-specifiable rest period in a rest position until the fluid in the container has largely settled.

The handling device can be equipped with handling aids disposed in the manner of a carousel. By the handling device, the container products can be loaded onto and unloaded from the production line. The test apparatus can then form a component of the production line of the container products produced using the BFS method.

For the evaluation of the measurement signals, the evaluation unit can use computerized image processing methods, which are commonly encountered in the prior art, such as grey value transformation, point operation and/or blending methods and which are based on known algorithms.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

FIG. 4 is a picture series with four pictures of a container card having four ampoules taken in a test station of the device.

DETAILED DESCRIPTION OF THE INVENTION

Figure 1:
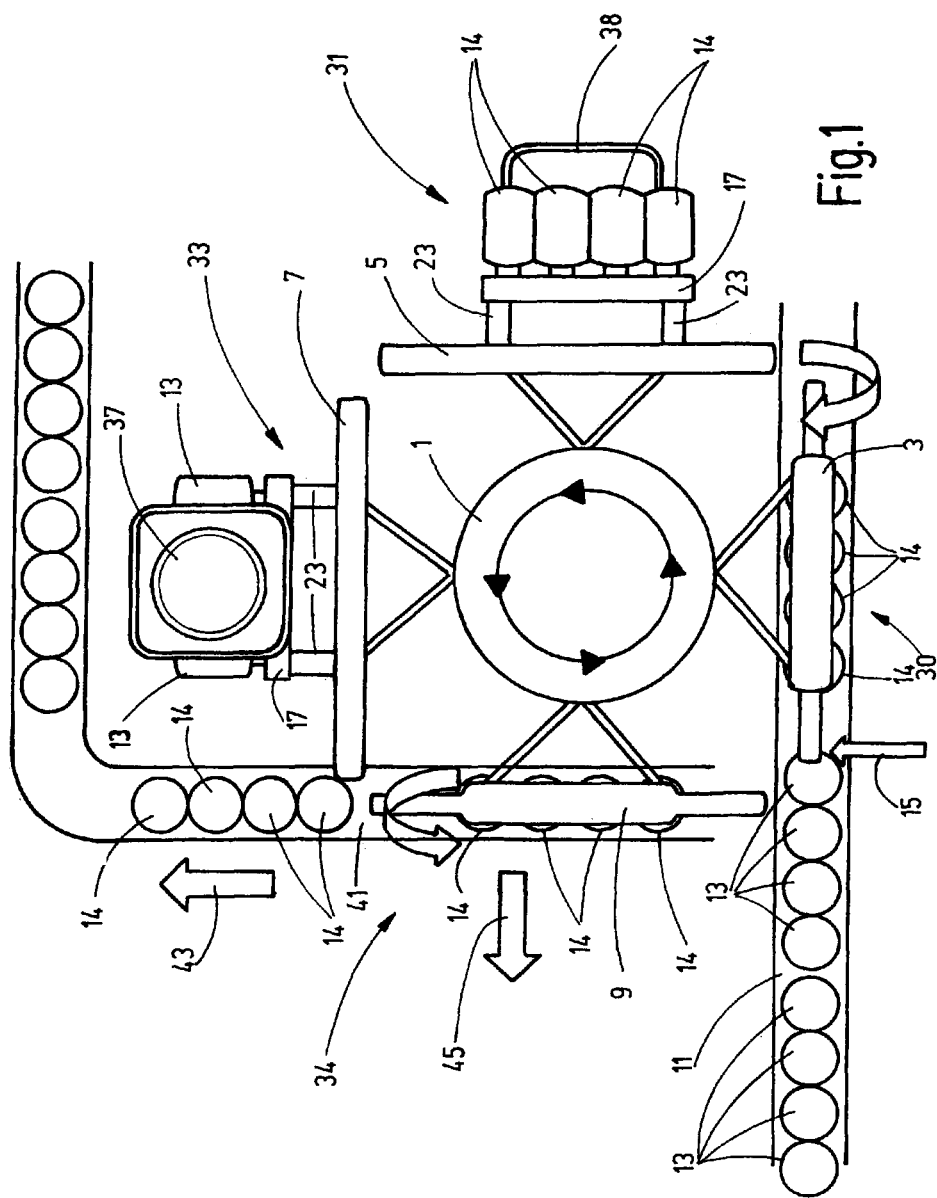
FIG. 1 is a schematic, simplified block diagram of a test apparatus according to an exemplary embodiment of the invention.

In FIG. 1, a central handling carousel 1 can be moved by grippers 3, 5, 7 and 9 counter-clockwise. By a belt conveyer 11, ampoules 13 to be tested (FIG. 2) are supplied standing upright as a container belt to the gripper 3 situated in a loading station 30. Gripper 3 is situated at the start of the test section formed by the handling carousel 1. Directly in front of the gripper 3, a separator 15 of the container belt separates container cards having, in the present case, four ampoules 13.

Figure 2:
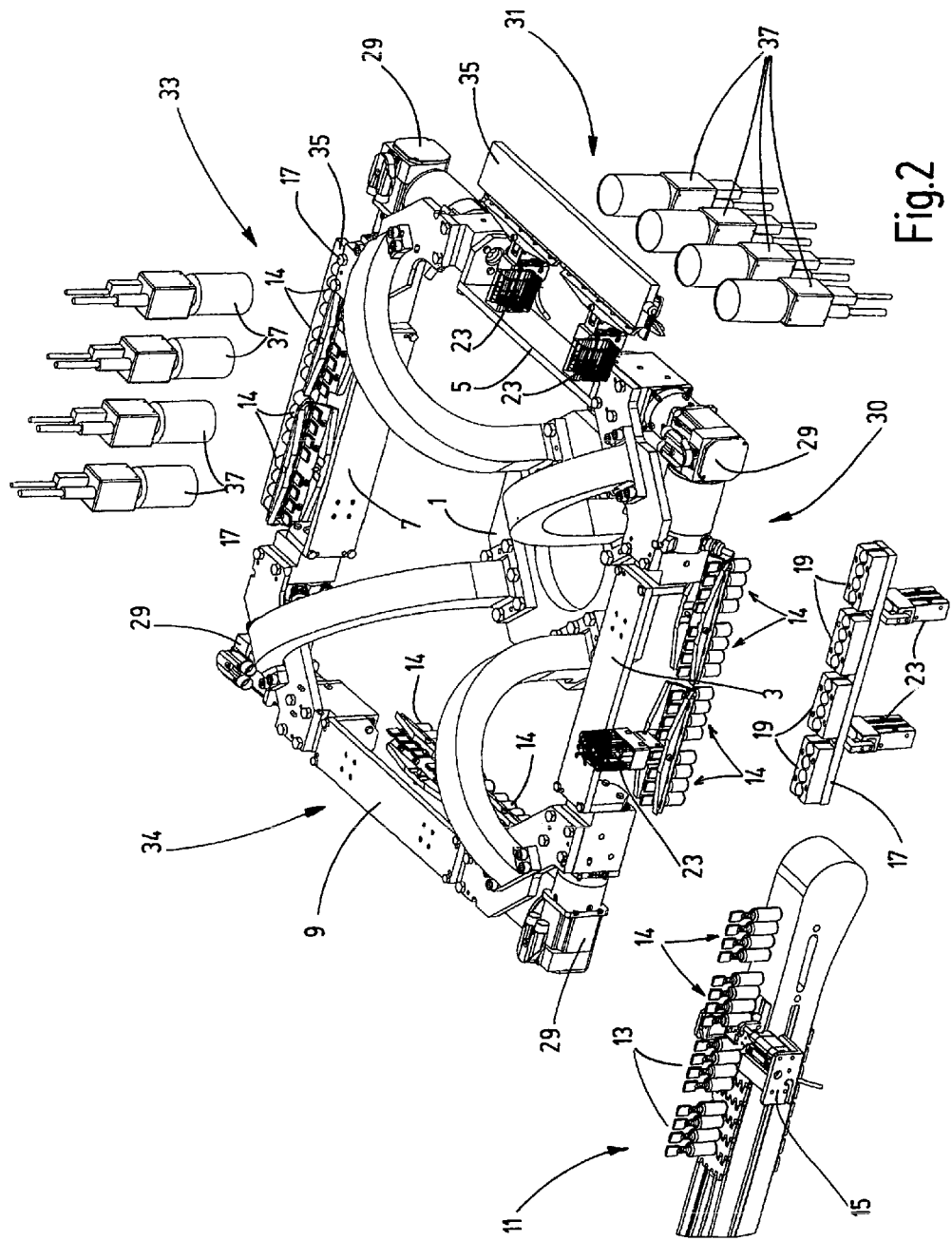
FIG. 2 is a schematically simplified, perspective view of functional elements of the exemplary embodiment.

The grippers 3, 5, 7, 9 each have a support unit 17, one of which is depicted in FIG. 2 in a position removed from the carousel 1 and next to the belt conveyer 11. As can be seen from FIG. 2, each support unit 17 has four ampoule receptacles 19, in each of which a container card 14 having four ampoules 13 can be received. The ampoules 13 are situated with their closing part, which has a rotary knob or rotatable closure as shown in FIG. 2, inside the receptacle 19, while the ampoule body containing the fluid is exposed, as can be seen in the case of the gripper 3 in FIG. 2. As FIG. 2 also shows, the position of the gripper 3 is such that the ampoules 13 are vertical and standing upright, i.e., are disposed in the same position as on the belt conveyer 11.

Figure 3:
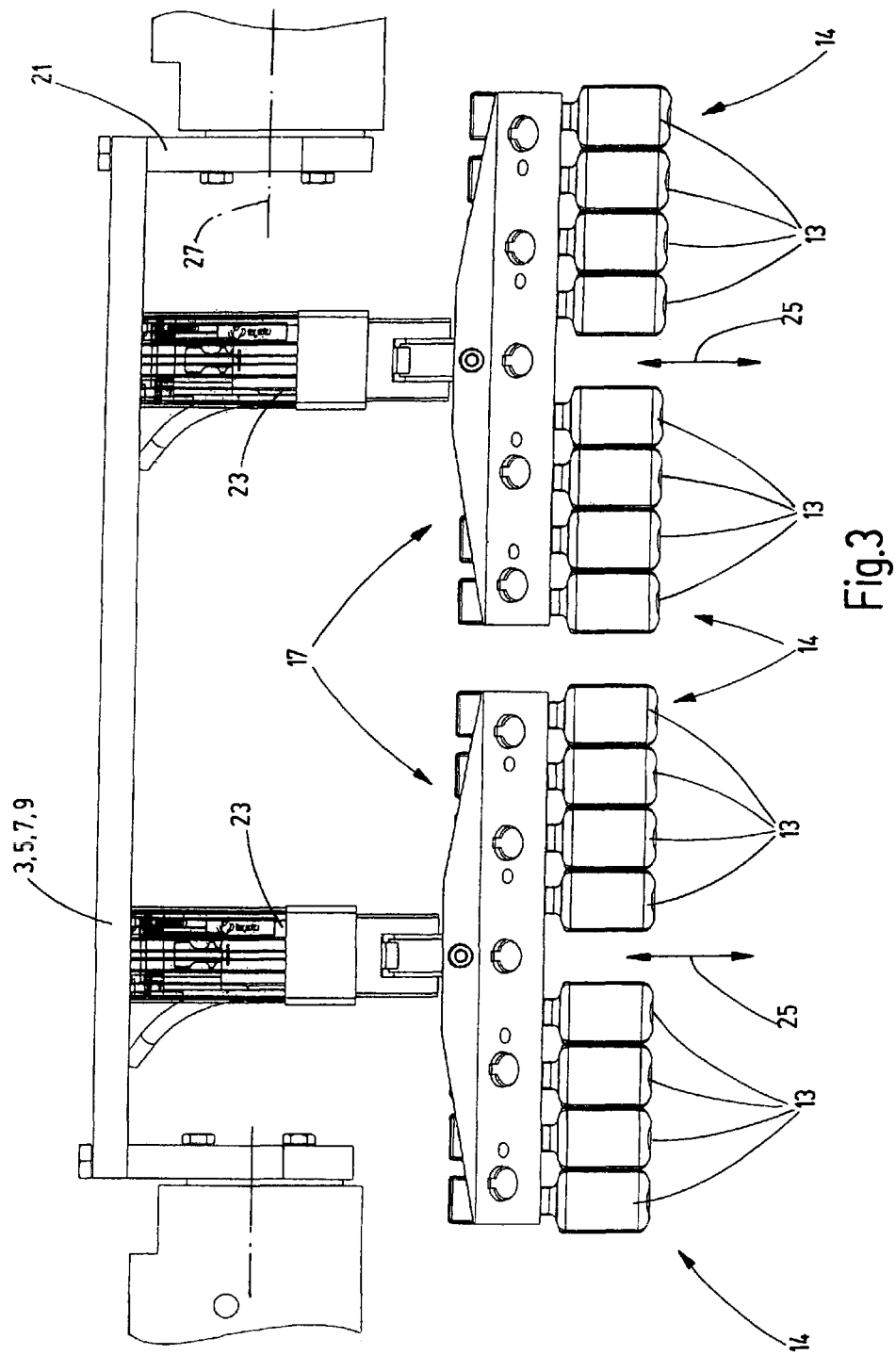
FIG. 3 is a side view of a part of a handling device of the exemplary embodiment of the device shown in approximately the full size of a practical embodiment.

A pair of electrically actuatable vibration generators 23, which are disposed spaced apart, is situated between the support unit 17 and the supporting structure 21 (FIG. 3) of each gripper 3, 5, 7, 9. In operation, they generate a vibration, whose vibration direction is illustrated in FIG. 3 by a double arrow 25. The vibration moves the ampoules 13 back and forth in their longitudinal direction.

The supporting structure 21 of each gripper 3, 5, 7, 9 can be rotated about a horizontal pivot axis 27, see FIG. 3. For this purpose the supporting structure 21 of each gripper 3, 5, 7, 9 is connected to a drive motor 29 (FIG. 2). After loading four container cards 14 of, in each case, four ampoules 13 that hang vertically downwards, as is shown in FIG. 2, on the gripper 3, the carousel 1 turns the gripper 3 90° counter-clockwise, so that the gripper 3 reaches a position aligned with a first test station 31, in which the gripper 5 was previously situated. The gripper 5 simultaneously moves into a second test station 33. During this rotation step, the drive motor 29 of the gripper 3 moves the supporting structure 21 by 90° so that, at the first test station 31 the container cards 14 and the ampoules 13 reach a horizontal position, in which the container bodies are oriented away from the carousel 1. In the first test station 31, a lighting device in the form of an LED panel 35, which extends over the entire area of the upper side of the horizontally lying ampoules 13, see FIG. 2, is situated above the ampoules 13. Only the LED panel 35 belonging to the first test station 31 is visible in FIG. 2. Below the ampoules 13, cameras 37 are provided as detectors for the light emitted by the LED panel 35 and passing through the horizontally lying ampoules 13 from top to bottom. One camera 37 is provided for each of the four container cards 14, which each hold four ampoules 13. In the simplified block depiction of FIG. 1, the four cameras 37 belonging to the first test station 31 are illustrated by a camera block designated by the reference numeral 38 and, instead of the four container cards 14 each having four ampoules 13, only one ampoule 13 is shown for every container card 14.

In operation, when the first test station 31 is reached, the vibration generators 23 oscillate the support unit 17 with the ampoules 13, before the cameras 37 are actuated to take pictures. This actuation of the cameras occurs after the vibration generators 23 have been stopped, with a rest period elapsing before each camera 37 takes a first picture. During the rest period, the fluid of the ampoules 13, which had been oscillated, settles, so that only freely floating particles, which are to be detected, are in motion or have changed their position. Mobile shadows in fluid in motion could otherwise be wrongly interpreted as dirt particles. Immediately after the fluid motion is stopped, which occurs approximately 500 ms after the oscillation has come to an end, the cameras 37 take a first picture of the assigned container card 14. The four ampoules 13 of each card 14 are irradiated from top to bottom. The first picture is followed by additional vibration and picture cycles at short intervals, for example, three additional pictures in a range of 200 ms. The entire picture series of four pictures, including the prior rest period, is then completed within approximately one second, and at most within two or three seconds. FIG. 4 shows an example of a corresponding series of four pictures, taken by one of the four cameras 37, i.e. four pictures of the same container card 14 are thus shown.

By an additional rotational motion of the carousel 1 by 90°, the respective gripper is subsequently moved out of the first test station 31 and into the second test station 33. The ampoules 13 remain in the same horizontal position. In the second gripping station 33, the cameras 37 are situated, as can be seen from FIG. 2, above the support unit 17 with the ampoules 13, while the illuminating LED support panel 35 is situated below. The cameras 37 detect the radiation that passes through the ampoules 13 from bottom to top. In the second test station 33, the test cycle takes place in a similar way to the first test station 31, i.e. contains an oscillation, followed by a damping phase in the range of approximately 500 ms and a subsequent picture series comprising four pictures and vibration cycles.

In an additional rotation of the carousel 1 by 90°, the gripper which was previously located in the second test station 33, which is the gripper 7 depicted in FIG. 2, moves to the next output station 34 on the test section. During the motion, the associated drive motor 29 conducts a pivot motion about the axis 27 (FIG. 3), so that the container cards 14 in the output station 34 hang vertically downwards, i.e., have the same orientation as in the loading station 30. If the evaluation of the pictures taken in the first test station 31 and the second test station 33 find that the ampoules 13 are free from defects, the gripper moved into the output station 34, which is the gripper 9 in the figures, deposits the container cards 14 onto an output conveyor 41, which is depicted only in a schematic representation in FIG. 1. The output conveyor 41 moves the faultless container cards 14 in the transport direction indicated by arrow 43. If the test has found a dirt particle present, no container card 14 containing the defective ampoule 13 is deposited on the output conveyor 41. Instead, this container card 14 is, as illustrated in FIG. 1 by arrow 45, removed from the conveyor line of the output conveyor 41 and moved off to the side as defective product, as shown in FIG. 1 using arrow 45.

With a duration of the test sequence of the test stations 31 and 33 of approximately 1,500 msec, including a rest phase of 500 msec and a subsequent picture series, the apparatus according to the invention can be operated with a throughput of ampoules 13 to be tested that corresponds to the production speed of standard BFS systems for generation of ampoule-type container products. The test apparatus according to the invention can then be directly integrated into the production line.

With the different motion patterns that are shown for particles of different types and densities, such as metal particles or plastic particles, once the fluid has settled following prior oscillation, a high level of testing reliability is obtained using the apparatus according to the invention. In particular, picture series are taken once for a camera position above the horizontal ampoules 13 and with a focus on the fluid surface, and once for a camera position from below with a focus on the lower container wall. Metal particles due, for example, to the BFS production equipment in the form of abraded material, are usually found in the region of the lower container wall owing to their density, are not transparent and are high-contrast and easily detectable because of the lower camera 37, which is focused on the container wall.

Plastic particles, such as PP material, which can derive from the container material in the BFS filling method, are semi-transparent and have lower contrast. They preferably float on the fluid surface and are reliably detectable, despite their low contrast, by the upper camera 37 focused on the fluid surface. Plastic particles floating in the vicinity of a container wall also tend to be attracted, so to speak, by the wall next to them and tend to adhere to the wall, which identifies them as plastic particulate material.

FIG. 4 shows the picture series of a single container card 14. In the example shown, which was captured using a camera located below and focused on the lower container wall of the ampoules 13, a metal particle 47 can be detected, which moves to the right and slightly in the direction of the ampoule neck 49 in the picture sequence. The container card 14 shown in FIG. 4 shall therefore be removed from the conveyor line of the output conveyor 41 in the output station 34 and be taken in the direction of the arrow 45.

For the evaluation of the picture series shown by way of an example in FIG. 4, the image recognition methods known from the prior art can be used, such as grey value transformation, point operators and/or blending methods. In doing so, the image series captured once from the bottom to the top and once from the top to the bottom are reconciled. In addition, a comparison can be carried out using reference pictures showing contamination-free containers and permitting a calibration of the image recognition system used.

While one embodiment has been chosen to illustrate the invention, it will be understood by those skilled in the art that various changes and modifications can be made therein without departing from the scope of the invention as defined in the claims.

The invention claimed is:

1. A test apparatus that checks a sealed plastic container product filled with a fluid for particulate contamination in the fluid, the test apparatus comprising:
    first and second stations;
    first and second sensors in said first and second stations, respectively, arranged to detect changes in positions of contamination particles as a result of movement of the contamination particles, each said sensor having a radiation emitter and a radiation detector;
    first and second vibration devices in said first and second stations, respectively, receiving and oscillating the container products at a pre-specifiable excitation frequency causing the contamination particles to move and change positions and allowing said sensor to detect the particle contamination in the fluid; and
    a handling device holding the container product to be tested in a horizontal position in said first station in which said radiation detector of said first sensor is disposed below said container product and said radiation emitter of said first sensor is disposed above the container product, and taking the container product to be tested to said second station in which said radiation detector of said second sensor is disposed above the container product and the radiation emitter of said second sensor is disposed below the container product;
    whereby the test apparatus is capable of detecting and differentiating air bubbles from other particles in the sealed plastic container product.

2. A test apparatus according to claim 1 wherein
    each said vibration device has an oscillating motion extending along a longitudinal axis of the container product coupled thereto.

3. A test apparatus according to claim 1 wherein
    the container product comprises multiple containers connected to form a card.

4. A test apparatus according to claim 1 wherein
said excitation frequency is selected depending on a viscosity of the fluid in the container product such that larger air bubbles remain stationary in the fluid and contamination particles move in the fluid to be detected.

5. A test apparatus according to claim 1 wherein
each said radiation emitter directs radiation through a container wall of the container product and the fluid in the container product, each said radiation detector being on an opposite side of the container product from the respective radiation emitter in each of said station, being struck by radiation from the respective radiation emitter and generating measurement signals; and
an evaluation device is connected to and receives the measurement signals from said radiation detectors, said evaluation device evaluating the measurement signals.

6. A test apparatus according to claim 5 wherein
each said radiation emitter emits at least one of visible light, infrared light, laser light or X-rays.

7. A test apparatus according to claim 5 wherein
each said radiation detector comprises a camera-recording device that takes several pictures of the contamination particles moving in the fluid after oscillation of the container product; and
said evaluation device compares image sections captured without the particulate contamination with image sections with the particulate contamination.

8. A test apparatus according to claim 1 wherein
said handling device holds the container product for a pre-specifiable rest period in a rest position until the fluid in the container product has settled.

9. A test apparatus according to claim 1 wherein
said handling device comprises a carousel on which the container product can be loaded onto and unloaded from a production line.

10. A test apparatus according to claim 7 wherein
said evaluation device comprises a computerized image processor evaluating the measurement signals.

11. A test apparatus according to claim 10 wherein
said computerized image processor comprises at least one of a grey value transformer, a point operator or a blender system.

12. A method of testing a sealed plastic container product filed with a fluid for particulate contamination in the fluid, the method comprising the steps of:
arranging by a handling device the container product in a horizontal position at a first sensor in a first station in which a radiation detector of the first sensor is disposed below the container product and a radiation emitter of the first sensor is disposed above the container product;
arranging by the handling device the container product in a horizontal position at a second sensor in a second station in which a radiation detector of the second sensor is disposed above the container product and a radiation emitter of the second sensor is disposed below the container product;
vibrating the container product at a pre-specifiable excitation frequency in each of the stations causing any contamination particles in the fluid to move and change positions in the container product; and
detecting changes in the positions of the contamination particles and in positions of air bubbles in the container product in each of the stations to determine the particulate contamination and to differentiate the particle contamination from the air bubbles.

13. A method according to claim 12 wherein
the container product is oscillated along a longitudinal axis of said container product.

14. A method according to claim 12 wherein
said excitation frequency is selected depending on a viscosity of the fluid in the container products such that larger air bubbles remain stationary in the fluid and contamination particles move in the fluid to be detected.

15. A method according to claim 12 wherein
each radiation emitter directs radiation through a container wall of the container product and the fluid in the container product, and each radiation detector being on an opposite side of the container product from the radiation emitter in each of the stations, being struck by radiation from the respective radiation emitter and generating measurement signals; and
an evaluation device is connected to and receives the measurement signals from the radiation detector, the evaluation device evaluating the measurement signals.

16. A method according to claim 15 wherein
the radiation emitter emits at least one of visible light, infrared light, laser light or X-rays.

17. A method according to claim 15 wherein
each radiation detector comprises a camera-recording device that takes several pictures of the contamination particles moving in fluid after oscillation of the container product; and
the evaluation device compares image sections captured without the particulate contamination with image sections with the particulate contamination.

18. A method according to claim 12 wherein
the handling device holds the container product for a pre-specifiable rest period in a rest position until the fluid in the container products has settled.

19. A method according to claim 12 wherein
the handling device comprises a carousel on which the container product is loaded onto and unloaded from a production line.

20. A method according to claim 17 wherein
the evaluation device comprises a computerized image processor evaluating the measurement signals.

* * * * *